Dec. 17, 1968   R. W. ANDERSON ET AL   3,417,176
PROCESS OF FORMING HEAT SHRINKABLE PERFLUOROCARBON
POLYMER TUBING AND SHAPES
Filed Dec. 24, 1964   2 Sheets-Sheet 2
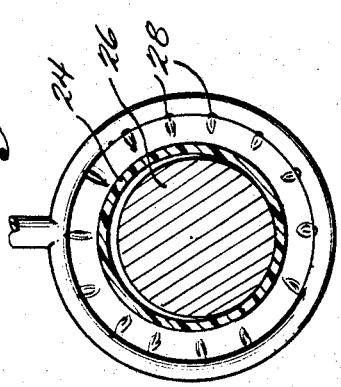
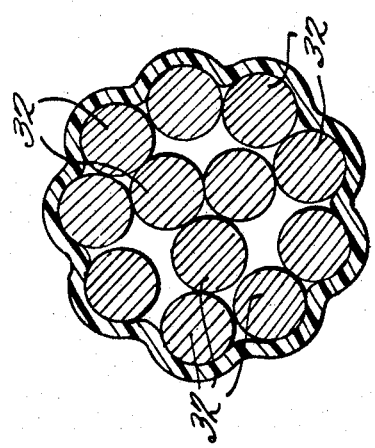
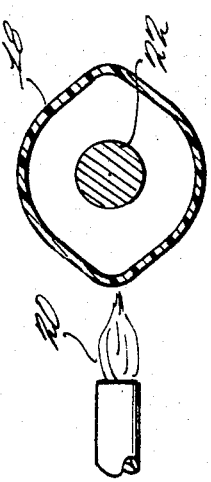
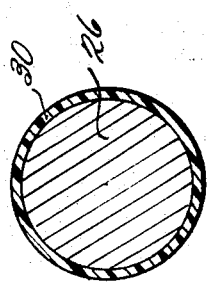
INVENTORS
ROBERT W. ANDERSON
AIME J. PERREAULT
BY
ATTORNEYS

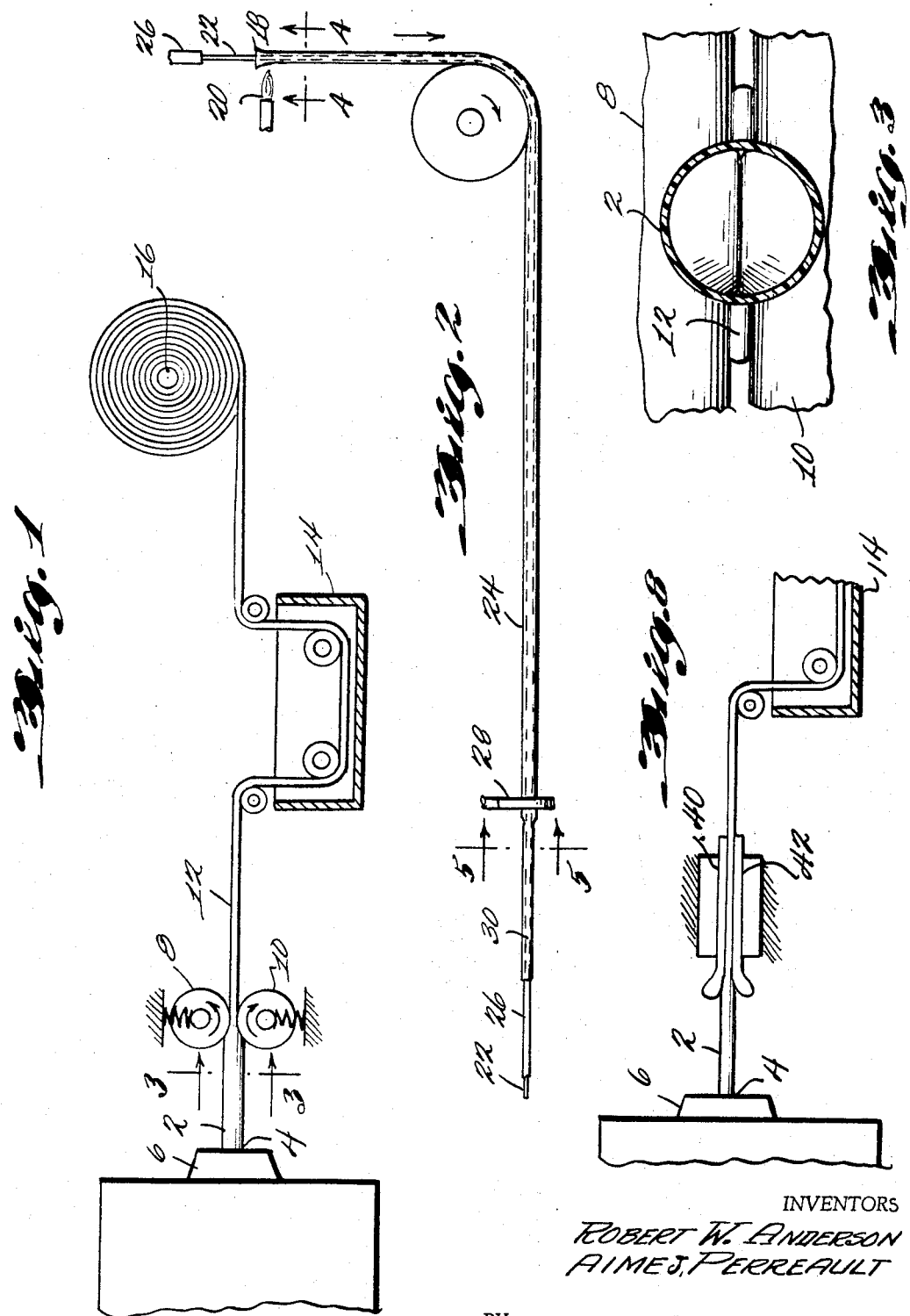

United States Patent Office 3,417,176
Patented Dec. 17, 1968

3,417,176
PROCESS OF FORMING HEAT SHRINKABLE PERFLUOROCARBON POLYMER TUBING AND SHAPES
Robert W. Anderson, Burlington, and Aime Joseph Perreault, South Burlington, Vt., assignors to Haveg Industries, Inc., Wilmington, Del., a corporation of Delaware
Filed Dec. 24, 1964, Ser. No. 420,939
14 Claims. (Cl. 264—230)

ABSTRACT OF THE DISCLOSURE

Perfluorocarbon or polytrifluorochloroethylene tubing is stretched by flattening the tubing under pressure to form a tape and reduce the cross sectional area of the tubing while simultaneously elongating the tubing. The tubing is reheated, an electrical conductor is inserted into the tubing and the tubing is shrunk into tight engagement with the conductor.

---

This invention relates to the stretching of perfluorocarbon polymers.

It is common practice to employ Teflon (polytetrafluoroethylene) as a covering for electrical conductors. Normally the Teflon is extruded around the conductor. This procedure, however, leaves something to be desired.

It has been proposed in St. John Patent 3,050,786 to stretch Teflon tubing and then shrink it around a rod. The procedure of St. John, however, can only be employed to prepare stretching tubing in relatively short lengths.

An object of the present invention is to devise a novel procedure for stretching perfluorocarbon polymer tubing.

Another object is to develop a procedure for manufacturing stretched perfluorocarbon polymer tubing of any desired length.

A further object is to develop an inexpensive and easy to control method of stretching perfluorocarbon polymer tubing.

An additional object is to develop an improved procedure for covering electrical conductors with a perfluorocarbon polymer.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by flattening unstretched perfluorocarbon polymer tubing under pressure to form a stretched tape which is essentially planar and rectangular in cross section. The stretching is primarily uniaxial when using squeeze rolls and is either uniaxial or biaxial when using flat plates or platens. Preferably the stretching is carried out on hot perfluorocarbon polymer tubing, e.g., between 75° C. and 500° C. although lower temperatures can be employed, e.g., room temperatures such as 15° C. or 20° C. Preferably temperatures of at least about 205° C. are employed. If the flattened tubing is formed hot it is preferably allowed to cool under tension to below 260° C., more desirably below 100° C. and most preferably to room temperature, e.g., 20° C. Upon reheating the flattened tubing first regains its tubular shape, i.e. it again becomes circular in cross section and then shrinks further. To reduce the expanded tube to its original size the material, e.g., Teflon, temperature is raised, usually above 75° C. and preferably to 260 to 450° C. The heating can be from one millisecond to two hours depending on the source of heat and the amount of shrinkage desired. The time of heating is normally not a critical factor.

The tubing employed can be formed initially by extrusion or wrapping, but regardless of the method of formation it is stretched or expanded longitudinally by pinch rolls (or is stretched both laterally and longitudinally by such rolls) or is stretched longitudinally and/or laterally by pressing it between platens. The amount of pressure required using rolls or plates will vary to some extent with the temperature, material, material thickness and the degree of stretching. Pressures of 10,000 to 40,000 p.s.i. are normally employed although higher or lower pressures can be used.

While the invention is primarily useful in the stretching of polytetrafluoroethylene, it is suitable for stretching other perfluorocarbon polymers such as hexafluoropropylene and fluorinated ethylene propylene polymers such as tetrafluoroethylene with 5 to 95% of hexafluoropropylene, e.g., 80% tetrafluoroethylene 20% hexafluoropropylene copolymer, 50% tetrafluoroethylene 50% hexafluoropropylene copolymer and polymers such as tetrafluoroethylene-hexafluoropropylene copolymers having weight ratios of 75:25 or 30:70 or 34:66 or 19:90 or 1:2 or 4:3 or 23.8:30 or 85:15. There can also be employed polytrifluorochloroethylene.

Unless otherwise indicated all parts and percentages are by weight.

The stretching is normally at least 25% and more preferably is at least 100% and can be as much as 700% either uniaxially or biaxially.

The tubing can be expanded in a single pass or with a plurality of passes. Thus in stretching longitudinally by passing through calendering rolls the cross sectional area of the tubing can be reduced from 1% to 90% in a single pass if the wall thickness of the tube is not over 30 mils, e.g., if the wall thickness is 1 to 30 mils. A single pass can also be employed in partially reducing the cross sectional area of thicker tubing, e.g., tubing having a thickness of from 30 to 500 mils. However, for more complete reduction in cross sectional area (and greater longitudinal stretching) of thick tubing, e.g., 30 mils and above, multiple passes are best employed, e.g., 2, 3, 4, 5 or 6 passes. In like manner single or multiple passes can be employed when using platens.

The invention will be understood best in connection with the drawings wherein:

FIGURE 1 is an overall diagram illustrating a preferred form for carrying out the first step of the process of the invention;

FIGURE 2 is a diagram illustrating the second stage of the process;

FIGURE 3 is a sectional view along the line 3—3 of FIGURE 1;

FIGURE 4 is a sectional view along the line 4—4 of FIGURE 2;

FIGURE 5 is a sectional view along the line 5—5 of FIGURE 2;

FIGURE 6 illustrates one type of product made according to the invention;

FIGURE 7 illustrates another type of product made according to the invention; and FIGURE 8 illustrates an alternative form of the invention.

While the invention is primarily directed to expanding tubing of Teflon and the like it can also be employed to expand other hollow shapes the walls of which are made of a perfluorocarbon polymer.

Referring more specifically to FIGURE 1 of the drawings polytetrafluoroethylene tubing 2 is extruded continuously from the annular orifice 4 in die 6. The tubing is then passed through a set of pinch rolls such as calendering rolls 8 and 10 which flatten and expand the tubing lengthwise. The flattened tubing is shown at 12. The calendering rolls are heated by any suitable heating source (not shown), e.g. hot liquid can be circulated through the rolls. As a result of the flattening of the tubing which uniaxially orients it longitudinally the cross sectional area is reduced.

The flattened tubing 12 passes through a water quench tank 14 to cool it and is subsequently taken up on spool 16.

When it is desired to use the flattened tube as a jacket for insulated or uninsulated wire or cable incipient opening of the flattened tube is made by any suitable means. Thus as shown in FIGURE 2 the end 18 of the flattened tube is heated, e.g., by flame 20. This causes the tube to reassume its circular cross section. A lead wire 22 of fine gauge and easily handled is then drawn through the desired length of the expanded tube 24 in the direction of the arrow by blowing, e.g., with air pressure, or by any other suitable means. The insulated (or uninsulated) wire (or cable) which is to be jacketed is connected to the lead wire. Such an insulated wire is shown at 26. The lead wire is pulled out of the tube so as to pull in and replace it with the insulated (or uninsulated) wire (or cable). As can be seen from FIGURES 4 and 5 the wire 26 is of considerably larger diameter than the lead wire 22 and more closely approximates the diameter of the expanded tube 24. After the wire 26 is introduced into the expanded tube 24 heat is applied to the tube 24 through ring heater 28, e.g., at 260° C. to shrink the tube as shown at 30 to tightly surround wire 26.

FIGURE 7 shows a product produced by a modification of the above described procedure where instead of jacketing a single wire 26 there is packeted by the shrunk polytetrafluoroethylene 30 a cable composed of a plurality of insulated wire strands 32. The cable is introduced into the expanded tubing with the aid of a lead wire in the manner previously described. In this embodiment, however, upon shrinking the expanded polytetrafluoroethylene does not surround a single wire but instead tightly binds the strands of the cable together so that they cannot slip out of position.

FIGURE 8 illustrates a modification in which the polytetrafluoroethylene tubing 2 is extruded from the annular orifice 4 in die 6 and the tubing is then passed between upper platen 40 and lower platen 42 where a pressure of 20,000 p.s.i. is applied. If the platens are heated, e.g., to 300° C. then the tubing is passed into quench bath 14. The tubing is then further processed in the manner described in connection with FIGURES 1 and 2.

In the event that there are used cold calendering rolls, e.g., rolls at room temperature, or cold platens then the quench tank 14 can be eliminated.

In a specific example using the apparatus of FIGURES 1 and 2 Teflon tubing having a thickness of 25 mils was passed through heated calendering rolls at 300° C. and was then quenched to room temperature in water bath 14. The calendering rolls were adjusted so that the thickness of the flattened tubing was one half that of the tubing before the calendering rolls. This corresponded to an elongation of 2:1. The lumen of the flattened tube had a diameter of 375 mils. A lead wire of about 10 mils was introduced into the tube and a cable of about 350 mils diameter was attached thereto and pulled through the tube. Heat was applied at temperature of 290° C. with the aid of heater 28 to shrink the tube into tight, binding engagement with the cable.

Similarly the tube can be stretched by applying a 25,000 p.s.i. pressure at 275° C. via platens 40 and 42 to stretch the tubing 3 times longitudinally and 3 times laterally. The thus stretched tubing can then be reheated, e.g., to 275° C. and shrunk into tight engagement around an electrical conductor.

What is claimed is:
1. A process of continuously stretching tubing of a member of the group consisting of a perfluorocarbon polymer and polytrifluorochloroethylene comprising continuously flattening the unstretched tubing under pressure between opposed pressure elements engaging the outer surface of the tubing to form tape and reduce the cross-sectional area of the tubing wall while simultaneously elongating the tubing to make it shrinkable.

2. A process according to claim 1 wherein the polymer is polytetrafluoroethylene.

3. A process according to claim 2 wherein the pressure is applied while the tubing is at a temperature of 260 to 500° C.

4. A process according to claim 3 wherein the tubing is cooled sufficiently while under tension to prevent the tubing from spontaneously returning to its original shape.

5. A process according to claim 4 including the additional steps of reheating the tubing, inserting an object into the tubing and shrinking the tubing into tight engagement with said object.

6. A process according to claim 1 wherein the pressure is applied while the tubing is at room temperature.

7. A process according to claim 1 wherein said opposed pressure means are squeeze rolls each of which is rotatable on an axis transverse to the axis of said tubing.

8. A process according to claim 1 wherein the polymer is fluorinated ethylene propylene.

9. A process according to claim 1 wherein the polymer is polytrifluorochloroethylene.

10. A process according to claim 1 comprising reshaping the tape to form tubing and introducing into said stretched tubing a lead wire of substantially smaller diameter than the lumen of the tubing followed by at least one electrical conductor, the diameter of the electrical conductors introduced into the stretched tubing being less than the diameter of the stretched tubing but greater than the diameter of the unstretched tubing and shrinking said tubing into tight engagement with said electrical conductor.

11. A process according to claim 10 wherein a single electrical conductor is introduced into the stretched tubing.

12. A process according to claim 10 wherein a plurality of electrical conductors is introduced into the stretched tubing and the overall diameter of said electrical conductors in packed condition is greater than the diameter of the unstretched tubing but less than the diameter of the stretched tubing.

13. A process of continuously stretching tubing circular in cross section, of a perfluorocarbon polymer comprising continuously, unstretched and forcing said tubing between opposed pressure means engaging the outer surface of the tubing to flatten the tubing and form a tape rectangular in cross section and reduce the cross sectional area from 1 to 90% and to increase the diameter of the tubing.

14. A process according to claim 13 including the additional step of heating the stretched tubing sufficiently to regain its circular cross section and to at least partially shrink the tubing toward its original diameter.

References Cited

UNITED STATES PATENTS

| | | | |
|---|---|---|---|
| 2,915,786 | 12/1959 | Haroldson et al. | 264—210 |
| 3,302,241 | 2/1967 | Lemmer et al. | 18—14 |
| 3,050,786 | 8/1962 | St. John | 264—94 |
| 3,093,448 | 6/1963 | Kirkpatrick | 264—342 |
| 3,130,260 | 4/1964 | Gray | 264—230 |
| 3,225,129 | 12/1965 | Taylor | 264—342 |

ROBERT F. WHITE, *Primary Examiner.*

G. AUVILLE, *Assistant Examiner.*

U.S. Cl. X.R.

264—210, 249, 272, 290